United States

Yamasita

4,059,344

Nov. 22, 1977

[54] RETROFOCUS-TYPE OBJECTIVE FOR ENDOSCOPES

[75] Inventor: Nobuo Yamasita, Tama, Japan

[73] Assignee: Olympus Optical Co., Ltd., Japan

[21] Appl. No.: 768,595

[22] Filed: Feb. 14, 1977

Related U.S. Application Data

[63] Continuation of Ser. No. 624,823, Oct. 22, 1975, abandoned.

[30] Foreign Application Priority Data

Oct. 26, 1974 Japan ............................ 49-123033

[51] Int. Cl.$^2$ .............................................. G02B 13/04
[52] U.S. Cl. .................................. 350/220; 350/255
[58] Field of Search ............... 350/186, 214, 215, 220, 350/255; 128/4, 5, 6

[56] References Cited

U.S. PATENT DOCUMENTS 3,473,866  10/1969  Kirchhoff .......................... 350/220

*Primary Examiner*—Conrad J. Clark
*Attorney, Agent, or Firm*—Cushman, Darby & Cushman

[57] ABSTRACT

A retrofocus-type objective for endoscopes comprising a front diverging lens group and rear converging lens group, said rear lens group being divided into a first lens group and second lens group, said retrofocus-type objective being arranged to be focused by varying the airspace between said first and second lens groups. By the above arrangement, the front lens is kept fixed and serves also as a cover glass so that the retrofocus-type objective as a whole becomes small in size.

5 Claims, 2 Drawing Figures

RETROFOCUS-TYPE OBJECTIVE FOR ENDOSCOPES

This is a continuation of application Ser. No. 624,823, filed Oct. 22, 1975, now abandoned.

BACKGROUND OF THE INVENTION a. Field of the invention

The present invention relates to an objective for endoscopes and, more particularly, to a retrofocus-type objective for endoscopes.

b. Description of the prior art

Known objectives for endoscopes are generally focused by advancing the lens system as a whole. Besides, a retrofocus-type lens system is known as a lens system by which the image plane can be made flat over a wide area. For the retrofocus-type lens system, however, the aperture stop is arranged in the inside of the lens system. Consequently, the position of the entrance pupil comes off the front lens surface of the lens system and, therefore, the front lens diameter becomes large.

Besides, for endoscopes, a cover glass for waterproof purpose is provided in front of the objective for endoscopes. When, therefore, the objective for endoscopes is to be focused by advancing the lens system as a whole in case of an endoscope employing a retrofocus-type objective with a large front lens diameter, the airspace between the cover glass and lens system is to be varied and, consequently, the cover glass diameter becomes very large. It is, however, not desirable to make the cover glass diameter large because pain of the patient will increase.

SUMMARY OF THE INVENTION

It is, therefore, a primary object of the present invention to provide a retrofocus-type objective for endoscopes comprising a front diverging lens group and rear converging lens group, said rear converging lens group being divided into two lens groups, said retrofocus-type objective for endoscopes being arranged to be focused by keeping the front lens fixed and varying the total focal length of the rear converging lens group by varying the airspace between the said two lens groups constituting the rear converging lens group.

When the lens system is focused by keeping the front lens fixed and varying magnification of the rear converging lens group by varying the airspace between two lens groups constituting the rear converging lens group as mentioned in the above, it becomes impossible when magnification of the rear lens group becomes close to ×l, to focus the lens system on an object at a distance shorter than the distance at that time. In this case, the lens system can be focused within the range which satisfies the formula (1) when reference symbol $\beta$ represents magnification of the rear converging lens group when the object is at the infinite distance, reference symbol $f_B$ represents the focal length of the rear converging lens group, and reference symbol $\Delta$ represents the amount of movement of the position of the image focused by the front diverging lens group when the distance to the object becomes shorter.

$$\Delta \leq f_B(\beta + (1/\beta) - 2) \qquad (1)$$

When the rear converging lens group is divided into two groups as mentioned in the above, i.e., into a first lens group and second lens group, relation between magnifications of said first and second lens groups is expressed the following formula (2) where reference symbol $\beta_1$ represents magnification of the first lens group when the object is at the infinite distance, reference symbol $\beta_2$ represents magnification of the second lens group when the object is also at the infinite distance, reference symbol $f$ represents focal length of the endoscope objective as a whole, and reference symbol $f_F$ represents focal length of the front diverging lens group.

$$\beta_1 \cdot \beta_2 = \beta = f/f_F = \text{constant} \qquad (2)$$

From the above formula (2), it becomes $$|\beta_1| + |\beta_2| \geq 2\sqrt{|\beta|} \qquad (3)$$

That is, the sum of $|\beta_1|$ and $|\beta_2|$ may be an arbitrary value which is larger than $2\sqrt{|\beta|}$. However, in order to make either $|\beta_1|$ or $|\beta_2|$ smaller than $|\beta|$ and at the same time to make it possible to focus the lens system on an object at a short distance, it is necessary to satisfy the following condition.

$$|\beta_1| + |\beta_2| > 1 + \beta$$

When the condition $|\beta_1| + |\beta_2| > 1 + |\beta|$ is satisfied, either $(\beta_1 + (1/\beta_1))$ or $(\beta_2 + (1/\beta_2))$ becomes larger than $(\beta + (1/\beta))$, and it becomes possible to focus the lens system on an object at a short distance when it is arranged to focus by moving the lens group for which the above-mentioned value becomes larger than $(\beta + (1/\beta))$.

DETAILED DESCRIPTION OF THE PREFERRED EMBODIMENTS

Preferred embodiments of the retrofocus-type objective for endoscopes according to the present invention explained in the above are as shown below.

| Embodiment 1 | | | |
|---|---|---|---|
| $r_1 = 6.888$ | | | |
| $d_1 = 0.7$ | | $n_1 = 1.51633$ | $\nu_1 = 64.1$ |
| $r_2 = 1.446$ | | | |
| $d_2$ (Variable) | | | |
| $r_3 = -7.022$ | | | |
| $d_3 = 1.2$ | | $n_2 = 1.69680$ | $\nu_2 = 55.7$ |
| $r_4 = -3.565$ | | | |
| $d_4$ (Variable) | | | |
| $r_5 = 19.657$ | | | |
| $d_5 = 1.2$ | | $n_3 = 1.69680$ | $\nu_3 = 55.7$ |
| $r_6 = -5.829$ | | | |
| $d_6 = 0.2$ | | | |
| $r_7 = 7.783$ | | | |
| $d_7 = 2$ | | $n_4 = 1.69680$ | $\nu_4 = 55.7$ |
| $r_8 = -2.831$ | | | |
| $d_8 = 0.7$ | | $n_5 = 1.78472$ | $\nu_5 = 25.7$ |
| $r_9 = 43.3$ | | | |
| $f = 2.493$, $F_{NO} = 3.0$, $2\omega = 70°$ (Diagonal); 48° 30' (between opposite sides) | | | |
| $f_F = -1.651$, $f_B = 3.305$ | | | |
| $\beta = -0.673$, $\beta_1 = 6.896$, $\beta_2 = -0.098$ | | | |

Figure 1:
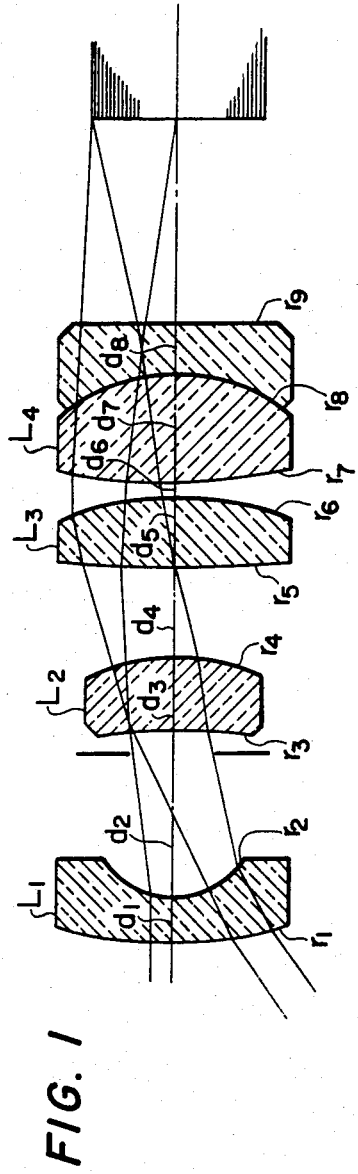
FIG. 1 shows a sectional view of Embodiment 1 of the retrofocus-type objective for endoscopes according to the present invention.

The above Embodiment 1 has lens configuration as shown in FIG. 1 and comprises a front diverging lens group and rear converging lens group. The front diverging lens group comprises a first lens component $L_1$ and the rear coverging lens group comprises a second lens component $L_2$, third lens component $L_3$ and fourth lens component $L_4$. The rear converging lens group is divided into two groups, i.e., a first lens group which comprises the second lens component $L_2$ and a second lens group which comprises the third lens component $L_3$ and fourth lens component $L_4$, and the lens system according to Embodiment 1 is arranged to be focused by varying the airspace $d_4$ between said first and second lens groups. For varying said airspace $d_4$, there are two methods. One method is to move the second lens group and the other is to move the first lens group. Numerical values of airspaces $d_2$ and $d_4$ when the airspace $d_4$ is varied by these two methods are as shown below.

(1) When the second lens group is moved

|  | $d_2$ | $d_4$ |
|---|---|---|
| When distance to object is ∞ | 2.51 | 1.5 |
| When distance to object is 4 mm | 2.51 | 0.43 |

(2) When the first lens group is moved

|  | $d_2$ | $d_4$ |
|---|---|---|
| When distance to object is ∞ | 2.5 | 1.7 |
| When distance to object is 4 mm | 4.15 | 0.05 |

Embodiment 2

Figure 2:
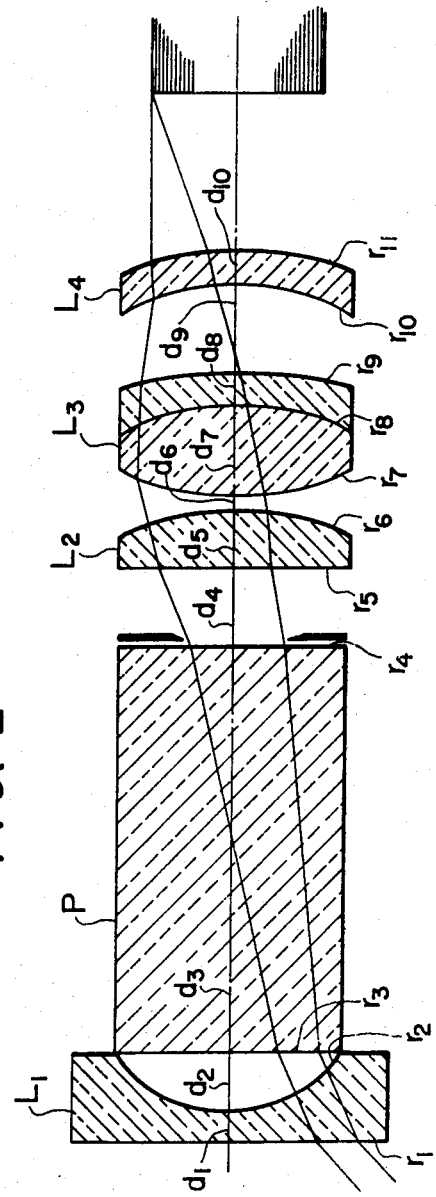
FIG. 2 shows a sectional view of Embodiment 2 of the retrofocus-type objective for endoscopes according to the present invention.

$r_1 = \infty$
$\quad d_1 = 0.6 \quad n_1 = 1.51633 \quad \nu_1 = 64.1$
$r_2 = 1.921$
$\quad d_2 = 0.9$
$r_3 = \infty$
$\quad d_3 = 6.9 \quad n_2 = 1.80610 \quad \nu_2 = 40.8$ (Prism)
$r_4 = \infty$
$\quad d_4$ (Variable)
$r_5 = -49.257$
$\quad d_5 = 1.0 \quad n_3 = 1.69680 \quad \nu_3 = 55.7$
$r_6 = -5.02$
$\quad d_6 = 0.2$
$r_7 = 4.254$
$\quad d_7 = 1.6 \quad n_4 = 1.62041 \quad \nu_4 = 60.3$
$r_8 = -3.883$
$\quad d_8 = 0.5 \quad n_5 = 1.84666 \quad \nu_5 = 23.9$
$r_9 = -7.972$
$\quad d_9$ (Variable)
$r_{10} = -3.885$
$\quad d_{10} = 0.5 \quad n_6 = 1.84666 \quad \nu_6 = 23.9$
$r_{11} = -6.706$
$f = 2.178, F_{NO} = 3.0, 2\omega = 85° 28'$ (Diagonal);
57° 30' (between opposite sides)
$f_F = -1.935, f_B = 2.703$
$\beta = 0.825, \beta_1 = -0.641, \beta_2 = 1.286$ The above embodiment 2 has lens configuration as shown in FIG. 2 and comprises a front diverging lens group, prism P and rear converging lens group. The front diverging lens group comprises a first lens component $L_1$ and the rear converging lens group comprises a second lens component $L_2$, third lens component $L_3$ and fourth lens component $L_4$. The rear converging lens group is divided into two groups, i.e., a first lens group which comprises the second lens component $L_2$ and third lens component $L_3$ and a second lens group which comprises the fourth lens component $L_4$, and the lens system according to Embodiment 2 is arranged to be focused by varying the airspace $d_9$ between said first and second lens groups. Numerical values of airspaces $d_4$ and $d_9$ when the airspace $d_9$ is varied are as shown below.

|  | $d_4$ | $d_9$ |
|---|---|---|
| When distance to object is ∞ | 1.33 | 1.5 |
| When distance to object is 5 mm | 0.7 | 2.13 |

As explained in the above, the retrofocus-type objective for endoscopes according to the present invention can be focused without advancing the lens system as a whole, i.e., by keeping the front lens fixed. Therefore, the front lens can be used also as a cover glass for waterproof purpose. Thus, the present invention provides a retrofocus-type objective for endoscopes which is small in size and which can be focused favourably.

I claim:

1. A retrofocus-type objective for endoscopes comprising a front diverging lens group and a rear converging lens group consisting of a first lens group and a second lens group, said retrofocus-type objective for endoscopes being arranged to be focused by varying the airspace between said first and second lens groups while fixing said front diverging lens group at a constant position.

2. A retrofocus-type objective for endoscopes according to claim 1 which satisfies the following condition when reference symbol $\beta$ represents magnification of said rear converging lens group, reference symbol $\beta_1$ represents magnification of said first lens group, and reference symbol $\beta_2$ represents magnification of said second lens group:

$$|\beta_1| + |\beta_2| > 1 + \beta$$

3. A retrofocus-type objective for endoscopes comprising a front diverging lens group and rear converging lens group, said front diverging lens group comprising a first negative lens component, said rear converging lens component comprising a second positive lens component, third positive lens component and fourth positive cemented doublet lens component, said retrofocus-type objective for endoscopes being arranged to be focused by integrally moving said third and fourth lens components, said retrofocus-type objective for endoscopes having numerical values as given below:

$r_1 = 6.888$
$\quad d_1 = 0.7 \quad n_1 = 1.51633 \quad \nu_1 = 64.1$
$r_2 = 1.446$
$\quad d_2$ (Variable)
$r_3 = -7.022$
$\quad d_3 = 1.2 \quad n_2 = 1.69680 \quad \nu_2 = 55.7$
$r_4 = -3.565$
$\quad d_4$ (Variable)
$r_5 = 19.657$
$\quad d_5 = 1.2 \quad n_3 = 1.69680 \quad \nu_3 = 55.7$
$r_6 = -5.829$
$\quad d_6 = 0.2$
$r_7 = 7.783$
$\quad d_7 = 2 \quad n_4 = 1.69680 \quad \nu_4 = 55.7$
$r_8 = -2.831$
$\quad d_8 = 0.7 \quad n_5 = 1.78472 \quad \nu_5 = 25.7$
$r_9 = 43.3$
$f = 2.493, F_{NO} = 3.0, 2\omega = 70°$ (Diagonal);
48° 30' (between opposite sides)
$f_F = -1.651, f_B = 3.305$
$\beta = -0.673, \beta_1 = 6.896, \beta_2 = -0.098$ 4. A retrofocus-type objective for endoscopes according to claim 3, in which said second lens component in said rear converging lens group is arranged to be moved for focusing instead of said third and fourth lens components.

5. A retrofocus-type objective for endoscopes comprising a front diverging lens group, a prism and a rear converging lens group, said front diverging lens group comprising a first negative lens component, said rear converging lens group comprising a second positive lens component, third positive cemented doublet lens component and fourth negative lens component, said retrofocus-type objective for endoscopes being arranged to be focused by integrally moving said second and third lens components, said retrofocus-type objective for endoscopes having numerical calues as given below:

$r_1 = \infty$
  $d_1 = 0.6$    $n_1 = 1.51633$    $\nu_1 = 64.1$
$r_2 = 1.921$
  $d_2 = 0.9$ -continued $r_3 = \infty$
  $d_3 = 6.9$    $n_2 = 1.80610$    $\nu_2 = 40.8$ (Prism)
$r_4 = \infty$
  $d_4 = $ (Variable)
$r_5 = -49.257$
  $d_5 = 1.0$    $n_3 = 1.69680$    $\nu_3 = 55.7$
$r_6 = -5.02$
  $d_6 = 0.2$
$r_7 = 4.254$
  $d_7 = 1.6$    $n_4 = 1.62041$    $\nu_4 = 60.3$
$r_8 = -3.883$
  $d_8 = 0.5$    $n_5 = 1.84666$    $\nu_5 = 23.9$
$r_9 = -7.972$
  $d_9$ (Variable)
$r_{10} = -3.885$
  $d_{10} = 0.5$    $n_6 = 1.84666$    $\nu_6 = 23.9$
$r_{11} = -6.706$
$f = 2.178$, $F_{NO} = 3.0$, $2\omega = 85° 28'$ (Diagonal); $57° 30'$ (between opposite sides)
$f_F = -1.935$, $f_R = 2.703$
$\beta = 0.825$, $\beta_1 = -0.641$, $\beta_2 = 1.286$

* * * * *